Aug. 25, 1925.     D. CHARLESTON ET AL     1,550,878
ELECTRIC HEATING TORCH
Filed Jan. 9, 1925
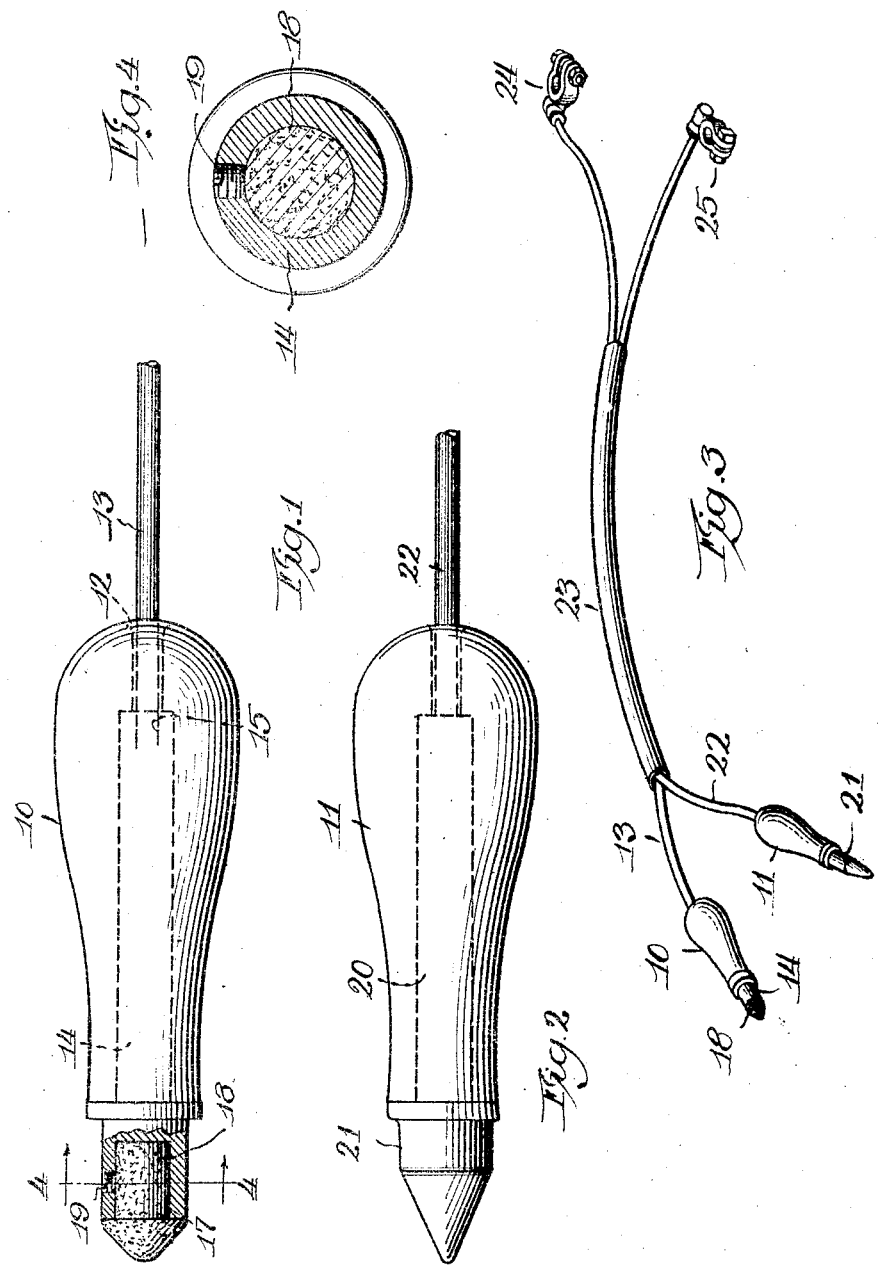
Witness:
Chas. R. Koursh.
Inventor,
Donald Charleston,
and Paul Matthews,
Atty Patented Aug. 25, 1925.

1,550,878

UNITED STATES PATENT OFFICE.

DONALD CHARLESTON AND PAUL MATTHEWS, OF CHICAGO, ILLINOIS.

ELECTRIC HEATING TORCH.

Application filed January 9, 1925. Serial No. 1,408.

*To all whom it may concern:*

Be it known that we, DONALD CHARLESTON and PAUL MATTHEWS, citizens of the United States, residing at Chicago, in the county of Cook and State of Illinois, have invented a new and useful Improvement in an Electric Heating Torch, of which the following is a specification.

Our present invention relates to the provision of an electric heating torch or heat producing mechanism.

The object of our invention is the provision of a heater which may be used around and in connection with the repairing of secondary or storage batteries where the use of an open flame is extremely hazardous because of the generation of hydrogen incident to the functioning of secondary or storage batteries. Our device as will hereafter appear, may be used for loosening up the corroded bolts of terminals or terminals connectors, and may also be used for taking off fused terminals and fusing on, or what is called burning on, new terminals. Our torch is also extremely handy and useful in and about the repair of automobiles, and the ignition and lighting systems thereof, and, in fact, may be easily and conveniently used in any situation where it is desired to heat the parts and especially is this true in situations where it is not practicable to use an open flame.

Where the part to be heated is a good conductor of electricity, heat can be produced by bringing the terminals in contact therewith at the point it is desired to heat, and, also, the terminals may be heated by bringing the metallic terminal in contact with the carbon, and then either the carbon or metallic terminal may be separately applied to the part to be heated.

We attain the aforementioned object by means of the structure illustrated in the accompanying drawing in which,—

Fig. 1 is a view of the carbon terminal of our device partially in section,

Fig. 2 is a view of the metallic terminal of our device,

Fig. 3 is a prospective of the entire device,

Fig. 4 is a section on line 4—4 Fig. 1.

The torch consists of a pair of handles 10 and 11, the handle 10 being centrally bored to provide at one end a passageway 12 for a conductor cable 13. The center bore being enlarged and the enlargement extended to the other end of the handle to provide for the reception of a metallic core 14 bored at its inner end as at 15, to receive the end of a conductor cable 13. At its opposite end 17 the core also is bored to receive the shank of a headed carbon plug 18 which is secured in the core by means of the set screw 19.

The companion handle 11 is also central bored to receive a metallic core 20, one end whereof extends beyond the handle and is preferably provided with an enlarged conical head 21. The end of the handle furthest from the head 21 is bored for the passage of a conductor cable 22.

The cable heretofore referred to are of good size so as to pass the current without resistance. We have found the ordinary No. 4 cable to serve nicely. Commencing about a foot from the handles, the cables are preferably enclosed in suitable flexible tubing 23 to within about a foot of their other ends and to the other ends of the cables are respectively attached ordinary terminal connectors 24 and 25. Our device is operable in connection with an ordinary 6 volt storage battery, such as is generally used for starting and ignition in automobiles, and such a battery may be used a considerable time without recharging as the period necessary for heating is very short, and when the device is not actually used for heating it is using no current at all.

The enlarged head of the carbon plug 18, and the conical head 21 of the metallic core 20 should be noted, because by the proper manipulation of these elements a greater or less area may be heated. Also a considerable control of the application of the heat can be had by means of varying the pressure with which the carbon terminal is applied to the work.

Having described our invention what we claim as new and desire to secure by Letters Patent is:—

1. An electric heating device comprising a flexible conduit, a pair of conductor cables therein and extending from both ends thereof, a battery connector secured to each of said cables at one end, a pair of handles of insulating material, metallic cores within said handles with each of which a cable is connected, one of said cores being extended at one end from its handle and formed into an enlarged conical head, the other of said cores being provided at one end with a socket, a carbon plug having an enlarged head seated within said socket with the head extending from said socket and said handle, and means for securing said carbon plug within its socket.

2. An electric heating device comprising a pair of conductor cables, a circuit connector secured to each of said cables at one end, a pair of handles of insulating material, metallic cores within said handles with each of which a cable is connected, one of said cores being extended from its handle at one end and formed into an enlarged head, the other of said cores being provided at one end with a socket, a carbon plug having an enlarged head seated within said socket with the head extending from said socket and said handle and means for securing said plug in its socket.

3. An electric heating device comprising a pair of conductor cables, means for securing one end of each of said cables with terminals of a source of current, a conducting contact element having an enlarged coniform end secured to the other end of one of said cables, a socketed conductor secured to the other end of the other of said cables, heat and electrical insulating handles secured to said contact element and said socketed conductor, and a carbon plug having an enlarged coniform end seated in and extending from said socket.

4. An electric heating device comprising a pair of conductor cables, means for securing one end of each of said cables to terminals of a source of current, a conducting contact element having an enlarged contact surface secured to the other end of one of said cables, means formed of conducting material for holding a carbon plug secured to the other end of the other of said cables, a carbon having an enlarged contact surface secured to and extending from said means, and handles formed of heat and electric insulating material secured to said contact element and said carbon holding means.

DONALD CHARLESTON.
PAUL MATTHEWS.